Figure 5:
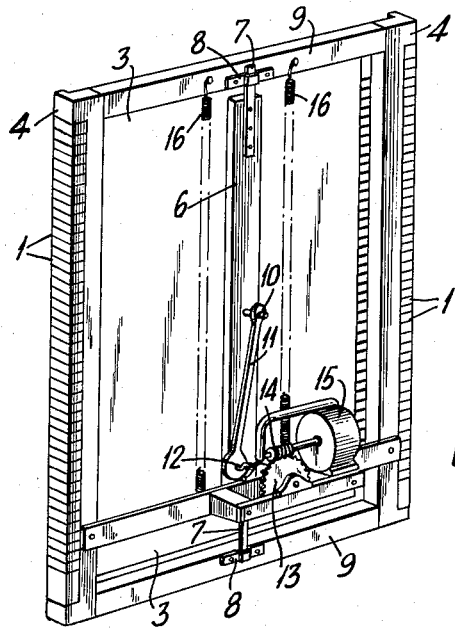

April 11, 1961     W. NOWICKI     2,978,822
ADVERTISEMENT SCREENS
Filed June 12, 1958     2 Sheets-Sheet 1
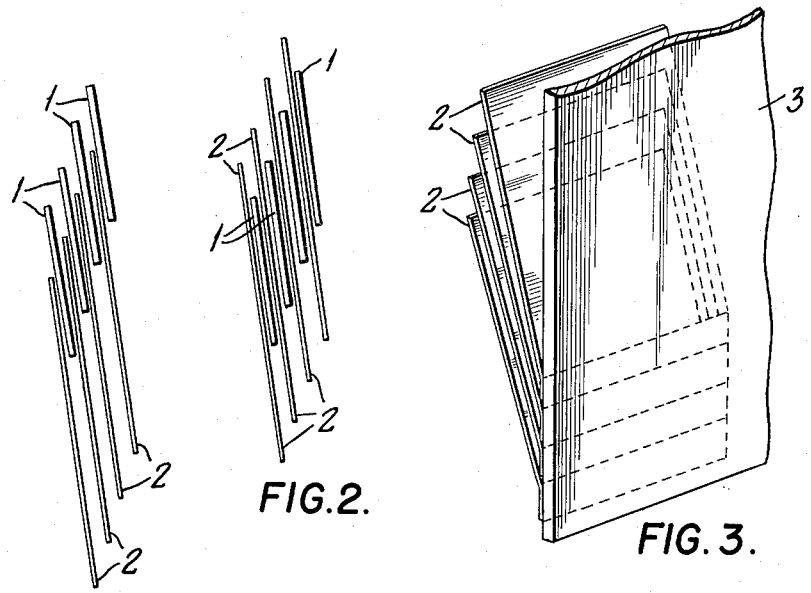
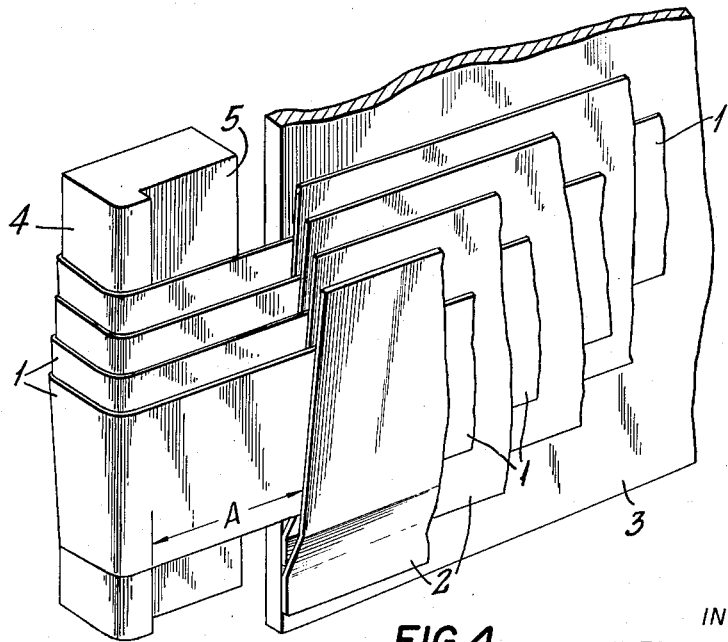
INVENTOR.
WITOLD NOWICKI April 11, 1961 W. NOWICKI 2,978,822
ADVERTISEMENT SCREENS Filed June 12, 1958 2 Sheets-Sheet 2

INVENTOR.
WITOLD NOWICKI
BY
ATTORNEY.

United States Patent Office 2,978,822
Patented Apr. 11, 1961

2,978,822
ADVERTISEMENT SCREENS
Witold Nowicki, Ul. Szopena 8, Zyrardow, Poland
Filed June 12, 1958, Ser. No. 741,641
Claims priority, application Poland Oct. 18, 1957
10 Claims. (Cl. 40—65)

The subject of this invention is an advertisement board or screen with fixed advertisement text or drawing and a background surface which quickly changes its color.

Quick change in color or advertisement screens or inscriptions, is widely used for attracting the eye of a passerby, but the use of an electric light for producing this effect in known constructions, practically limits their use to evening and night hours.

The object of this invention is to provide means for solving the problem of an advertisement board or screen which quickly changes the color of its background, and may be used in full daylight whereas by the use of an electric light it is not possible to obtain enough contrasting change of color.

A further object of the invention is the limitation of the thickness of an advertisement screen to the thickness of a picture frame or thereabout which greatly increases its effectiveness.

The advertisement screen according to the invention has a frame, and a background surface which is made of two sets of strips of different colors. The strips of one set are laid one on the other in a tile-like fashion, and the strips of one set interleave the strips of the other set. Besides this, at least one of these sets of strips is movable with respect to the other, either by pushing out its ends, or by withdrawing them from view behind the strips of the other set, which action results in a quick change of the background from one color to another.

The invention will now be described with reference to the accompanying drawing, in which is diagrammatically illustrated, by way of an example, one manner of construction of the advertisement screen.

Figure 6:
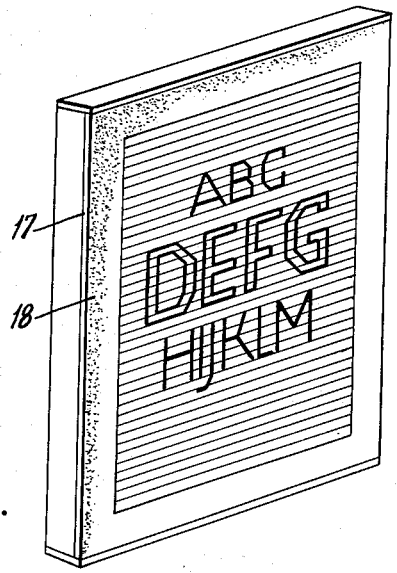

In the drawing,

Fig. 1 illustrates in the simplest form the two sets of strips 1 and 2 in one extreme relative position, Fig. 2 illustrates similarly the two sets of strips in the opposite extreme relative position, Fig. 3 is a back view of a part of the movable set of strips, Fig. 4 is an illustration of the general, relative layout of the two sets of strips, Fig. 5 is a back view of the advertisement screen, and Fig. 6 is a front view of the advertisement screen.

For the sake of simplicity, in the first four figures, only four strips in each set are shown. In this example all the horizontal strips 1 form one set of strips of one color. They are all equal in width and length. Vertical strips 2 form the second set of strips, each of the strips being of equal length and width. This second set is of a different, preferably contrasting color from the set of strips 1.

The strips in each set are arranged in tile like manner, so that viewed from the front as seen in Fig. 4 only the topmost parts of one or the other set of strips is visible. Strips 2 are interleaved one by one between strips 1, so that only their top parts protrude from behind strips 1.

When pulled down strips 2 are completely hidden from view, behind strips 1, and the background surface will suddenly change the color from that of strips 2 e.g. green, into the color of strips 1 e.g. red.

Strips 1 are fixed or stuck at both their ends to the two sides 4 of the frame. Strips 2 are fixed or stuck only with their bottom borders to a flat background sheet or plate 3 which is arranged movably up and down with respect to strips 1. To allow free movement of strips 2 relatively to strips 1, and to avoid tightening the sides of strips 2 between 2 between strips 1 in the vicinity of the points where the side ends of strips 1 are fixed to the sides 4 of the frame, it is advisable to shift these points of attachment a certain distance from the sides of strips 2 and to make undercuts 5 on both sides 4 of the frame. It follows that the horizontal length of strips 1 is substantially greater than the horizontal width of strips 2. To obtain a quick change of color of the background, the visible ends of strips 1 are narrow and in consequence the number of strips 1 and 2 is correspondingly big as seen in Fig. 6.

One practical embodiment of the mechanism moving the set of strips 2 up and down, together with the sheet or plates 3, is shown in Fig. 5. To the back of plate 3 is fixed a vertical lath 6, carrying at its ends two slides 7, slidably fitted in guides 8, fixed in the top and bottom parts 9 of the frame. When the background surface is big and the sheet or plate 3 is not stiff enough, it may be advisable to provide a pair or more laths 6 and more than two slides 7 with guides 8. Between the ends of lath 6 and horizontal parts 9 of the frame, there must be enough free space to allow this lath to move up and down together with plate 3.

The lath 6 is provided with a peg 10 serving as a pin for connecting rod 11, driven by the crank 12. Electric motor 15 coupled with worm 14, drives the worm wheel 13 fixed on the shaft crank 13. Through this crank 12 and connecting rod 11 the lath 6 is driven up and down. To eliminate the disadvantageous influence of the relatively big weight of moving parts, on the comparatively small motor, this weight is balanced by springs 16 hung on the top part 9 of the frame, and attached with their other ends to the bottom of lath 6.

In this type of advertisement screen, the advertisement itself is put on a transparent pane 17 of glass or a suitable plastic, fixed in front of the background. This pane also protects the strips from dust and damage, but to allow free movement of strips 2, it must be fitted a small distance away from them. Those parts of the background, which do not change the color, are covered by margin strips of any suitable character, or simply by nontransparent marginal painting 18 on the pane 17.

The automatic action of the advertisement screen is as follows. Crank 12 is rotated by the electric motor 15 and through the connecting rod 11 moves up and down the lath 6 and with it the plate 3 with its strips 2. It is advisable to make the distance of travel in each direction about three times the width of the visible parts of strips 1.

It is known that when rotary movement is changed by means of a crank and a connecting rod into a straight line reverse motion, the momentary speed of such a motion is changing from zero, in this case at the bottom and top dead points, to a maximum at mid points in between. The actuating mechanism in the advertisement screen may be so set up, that at the moment of maximum speed the free i.e. top, edges of strips 2 are moving over the center lines of the corresponding visible parts of strips 1. In this way the covering and uncovering of the visible parts of strips 1, and the resulting change of color of the background, is done at the maximum speed of motion of the strips 2, and so it takes only about 23% or less of the time of movement in one direction i.e. about 12% of the time of a full cycle. The rest of time is divided equally between the times for the two full colors. We then have the following visible succession of colors for one complete revolution of crank 12: one full color about 38% of time of one cycle Change over—about 12% of time of one cycle
Second full color—about 38% of time of one cycle
Change over—about 12% of time of one cycle If, for the same crank motion, we make the visible strips thinner, we increase the proportion of time for one full color to the time of change over, e.g. if the visible parts of strips 1 are made ¼ of the extent of travel of strips 2 in one direction, the time for a change over decreases to 8.3% and the time for one full color increases to 41.7% which is really more than sufficient for the effect of an instantaneous change.

In some cases it may be advisable to make one color last longer than another. This may be done simply by adjusting the position of plate 3 with its strips 2 not symmetrically as above with relation to strips 1, but more to the bottom or to the top.

The described mechanism has the advantage of a quiet run without jerks, but of course any other mechanical, pneumatic or electrical means suitable for making this movement in one direction and then in a reverse direction, may be used instead.

Advertising matter may be placed on the front pane or on its sides. It may be painted or cut from plastic foil, paper or any other suitable material and fixed on the pane. This advertising matter may also be hung on thin threads in front of the above described background, or on the sides of the screen.

Attractive matter may also be printed or painted directly on one or both sets of strips.

The shape of the advertising screen is not bound to be rectangular, and the top edges of strips are not bound to be straight lines and they may be curved or of another shape. Interesting effects may be obtained when at least one of the sets of strips is colored with at least two colors.

Strips 1 and 2 may be made of paper, or other suitable material. It was found advantageous to make plate 3 of a glass pane, which is stiff and flat enough, although it may also have the form of a foil stretched on a suitable frame.

It is obvious that the invention is not limited to the described example of an advertising screen, its frame or the direction of movement. In some cases it may be advisable to eliminate altogether parts 9 of the frame, provided that parts 4 are in some other way bound together e.g. by means of one or two central cross bars, completely hidden from view. If the screen is to have an elongated vertical form, it is advisable to make the vertical strips non-movable and the horizontal strips movable.

Having now particularly described my invention what I claim is:

1. An advertisement device adapted for periodically changing background color comprising, in combination, a rigid frame having laterally spaced-apart side members, a first set of strips stretched longitudinally across said frame with the ends of each strip being secured to said side members, said strips being disposed in partially-overlapping relationship so that only a portion of each strip is visible and the remainder of each strip is overlain by the next adjacent strip, and a second set of strips interleaved between the strips of said first set, the strips of said second set being disposed in partially-overlapping relationship so that only a portion of each strip is visible and the remainder of each strip is overlain by the next adjacent strip, means defining an extended surface disposed between said side members and being movable relatively to said side members in a direction parallel to said side members, one end only of the strips of said second set being secured to said surface, and motive means for automatically and periodically reciprocating said surface and thereby moving said second set of strips relatively to said first set of strips to selectively cover and uncover the visible portions of said first set of strips, said motive means comprising an electric motor, a reduction gear, a crank, and a connecting rod.

2. An advertisement device adapted for periodically changing background color comprising, in combination, a rigid frame having laterally spaced-apart side members, a first set of strips stretched longitudinally across said frame with the ends of each strip being secured to said side members, said strips being disposed in partially-overlapping relationship so that only a portion of each strip is visible and the remainder of each strip is overlain by the next adjacent strip, and a second set of strips interleaved between the strips of said first set, the strips of said second set being disposed in partially-overlapping relationship so that only a portion of each strip is visible and the remainder of each strip is overlain by the next adjacent strip, means defining an extended surface disposed between said side members and being movable relatively to said side members in a direction parallel to said side members, one end only of the strips of said second set being secured to said surface, and motive means for automatically and periodically reciprocating said surface and thereby moving said second set of strips relatively to said first set of strips to selectively cover and uncover the visible portions of said first set of strips, said first strips being secured to said side members along parallel lines and said second strips being secured to said surface along a line perpendicular to said parallel lines.

3. An advertisement device adapted for periodically changing background color comprising, in combination, a rigid frame having laterally spaced-apart side members, a first set of parallel strips stretched horizontally and longitudinally across said frame with the free ends of each strip being secured to said side members, said strips being disposed in partially overlapping relationship so that only a portion of each strip is visible and the remainder of each strip is overlain by the next adjacent strip, and a second set of parallel strips vertically interleaved between the strips of said first set, the strips of said second set being disposed in partially-overlapping relationship so that only a portion of each strip is visible and the remainder of each strip is overlain by the next adjacent strip, means defining an extended surface disposed between said side members and being movable relatively to said side members in a direction parallel to said side members, one end only of the strips of said second set being secured to said surface along a line parallel to said strips of said first set, motive means for automatically and periodically reciprocating said surface and thereby moving said second set of strips relatively to said first set of strips to selectively cover and uncover the visible portions of said first set of strips, and spring means counterbalancing the weight of said means defining said extending surface.

4. A device as defined in claim 3, wherein the second set are adapted to be continually in a to and fro motion, alternately protruding and hiding behind the strips of the first set to give the visual effect of a standstill in a first color, a quick change over to a second color, and a standstill in said second color.

5. An advertisement device adapted for periodically changing background color comprising, in combination, a rigid frame having laterally spaced-apart side members, a first set of strips stretched longitudinally across said frame with the ends of each strip being secured to said side members, said strips being disposed in partially-overlapping relationship so that only a portion of each strip is visible and the remainder of each strip is overlain by the next adjacent strip, and a second set of strips interleaved between the strips of said first set, the strips of said second set being disposed in partially-overlapping relationship so that only a portion of each strip is visible and the remainder of each strip is overlain by the next adjacent strip, means defining an extended surface disposed between said side members and being movable relatively to said side members in a direction parallel to said side members, one end only of the strips of said second set being secured to said surface, and motive means for automatically and periodically reciprocating said surface and thereby moving said second set of strips relatively to said first set of strips to selectively cover and uncover the visible portions of said first set of strips, said means defining said surface being provided with a guiding lath to guide the reciprocating movement of said surface in response to said motive means.

6. An advertisement device adapted for periodically changing background color comprising, in combination, a rigid frame having laterally spaced-apart side members, a first set of strips stretched longitudinally across said frame with the ends of each strip being secured to said side members, said strips being disposed in partially-overlapping relationship so that only a portion of each strip is visible and the remainder of each strip is overlain by the next adjacent strip, and a second set of strips interleaved between the strips of said first set, the strips of said second set being disposed in partially-overlapping relationship so that only a portion of each strip is visible and the remainder of each strip is overlain by the next adjacent strip, means defining an extended surface disposed between said side members and being movable relatively to said side members in a direction parallel to said side members, one end only of the strips of said second set being secured to said surface, and motive means for automatically and periodically reciprocating said surface and thereby moving said second set of strips relatively to said first set of strips to selectively cover and uncover the visible portions of said first set of strips, the side edges of the strips of the second set being spaced from the fixed ends of the strips of the first set to define an area in which said first strips extend beyond said second strips to permit free relative movement.

7. An advertisement device adapted for periodically changing background color comprising, in combination, a rigid frame having laterally spaced-apart side members, a first set of strips stretched longitudinally across said frame with the ends of each strip being secured to said side members, said strips being disposed in partially-overlapping relationship so that only a portion of each strip is visible and the remainder of each strip is overlain by the next adjacent strip, and a second set of strips interleaved between the strips of said first set, the strips of said second set being disposed in partially-overlapping relationship so that only a portion of each strip is visible and the remainder of each strip is overlain by the next adjacent strip, means defining an extended surface disposed between said side members and being movable relatively to said side members in a direction parallel to said side members, one end only of the strips of said second set being secured to said surface, motive means for automatically and periodically reciprocating said surface and thereby moving said second set of strips relatively to said first set of strips to selectively cover and uncover the visible portions of said first set of strips, and a transparent pane carrying advertising matter disposed in front of said second set of strips.

8. An advertisement device adapted for periodically changing background color comprising, in combination, a rigid frame having laterally spaced-apart side members, a first set of strips stretched longitudinally across said frame with the ends of each strip being secured to said side members, said strips being disposed in partially-overlapping relationship so that only a portion of each strip is visible and the remainder of each strip is overlain by the next adjacent strip, and a second set of strips interleaved between the strips of said first set, the strips of said second set being disposed in partially-overlapping relationship so that only a portion of each strip is visible and the remainder of each strip is overlain by the next adjacent strip, means defining an extended surface disposed between said side members and being movable relatively to said side members in a direction parallel to said side members, one end only of the strips of said second set being secured to said surface, and motive means for automatically and periodically reciprocating said surface and thereby moving said second set of strips relatively to said first set of strips to selectively cover and uncover the visible portions of said first set of strips, the strips of one of said sets having advertising matter placed directly thereon.

9. An advertisement device adapted for periodically changing background color comprising, in combination, a rigid frame having laterally spaced-apart side members, a first set of strips stretched longitudinally across said frame with the ends of each strip being secured to said side members, said strips being disposed in partially-overlapping relationship so that only a portion of each strip is visible and the remainder of each strip is overlain by the next adjacent strip, and a second set of strips interleaved between the strips of said first set, the strips of said second set being disposed in partially-overlapping relationship so that only a portion of each strip is visible and the remainder of each strip is overlain by the next adjacent strip, means defining an extended surface disposed between said side members and being movable relatively to said side members in a direction parallel to said side members, one end only of the strips of said second set being secured to said surface, and motive means for automatically and periodically reciprocating said surface and thereby moving said second set of strips relatively to said first set of strips to selectively cover and uncover the visible portions of said first set of strips, the strips of both of said sets having advertising matter placed directly thereon.

10. An advertisement device adapted for periodically changing background color comprising, in combination, a rigid frame having laterally spaced-apart side members, a first set of strips stretched longitudinally across said frame with the ends of each strip being secured to said side members, said strips being disposed in partially-overlapping relationship so that only a portion of each strip is visible and the remainder of each strip is overlain by the next adjacent strip, and a second set of strips interleaved between the strips of said first set, the strips of said second set being disposed in partially-overlapping relationship so that only a portion of each strip is visible and the remainder of each strip is overlain by the next adjacent strip, means defining an extended surface disposed between said side members and being movable relatively to said side members in a direction parallel to said side members, one end only of the strips of said second set being secured to said surface, and motive means for automatically and periodically reciprocating said surface and thereby moving said second set of strips relatively to said first set of strips to selectively cover and uncover the visible portions of said first set of strips, at least one of said two sets of strips being colored with at least two colors.

References Cited in the file of this patent

UNITED STATES PATENTS

| 2,829,456 | Hutterer | Apr. 8, 1958 |

FOREIGN PATENTS

| 256,980 | Switzerland | Mar. 16, 1949 |
| 1,022,214 | France | Mar. 2, 1953 |
| 1,119,976 | France | June 27, 1956 |